United States Patent
Scanlon et al.

(10) Patent No.: US 9,706,137 B2
(45) Date of Patent: Jul. 11, 2017

(54) ELECTRICAL CABINET INFRARED MONITOR

(71) Applicant: FLIR Systems, Inc., Wilsonville, OR (US)

(72) Inventors: Thomas J. Scanlon, North Billerica, MA (US); Michael Fox, Nashua, MA (US); Nicholas Högasten, Santa Barbara, CA (US); Theodore R. Hoelter, Goleta, CA (US); Katrin Strandemar, Rimbo (SE)

(73) Assignee: FLIR Systems, Inc., Wilsonville, OR (US)

( * ) Notice: Subject to any disclaimer, the term of this patent is extended or adjusted under 35 U.S.C. 154(b) by 169 days.

(21) Appl. No.: 13/839,118

(22) Filed: Mar. 15, 2013

(65) Prior Publication Data
US 2013/0250102 A1  Sep. 26, 2013

Related U.S. Application Data

(63) Continuation-in-part of application No. PCT/US2012/041744, filed on Jun. 8, 2012, and a
(Continued)

(51) Int. Cl.
*H04N 5/33* (2006.01)
*H04N 5/232* (2006.01)
(Continued)

(52) U.S. Cl.
CPC .................... *H04N 5/33* (2013.01)

(58) Field of Classification Search
CPC ...... H04N 5/23238; H04N 5/33; H04N 5/332; H04N 7/181; H04N 5/23241; H04N 5/247; H04N 5/265; G01J 2005/0081
(Continued)

(56) References Cited

U.S. PATENT DOCUMENTS 2,764,055 A   9/1956  Clemens at al.
4,608,598 A * 8/1986  Murakami ............. G01N 25/72
                                                      348/164
(Continued)

FOREIGN PATENT DOCUMENTS

CA   2764055   7/2012
CN   2874947   2/2007
(Continued)

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — Christopher S Kelley
*Assistant Examiner* — Deirdre Beasley
(74) *Attorney, Agent, or Firm* — Haynes and Boone, LLP

(57) ABSTRACT

Various techniques are provided to monitor electrical equipment. In some implementations, a monitoring system for a cabinet may include an infrared camera configured to capture thermal images of at least a portion of electrical equipment positioned in an interior cavity of the cabinet. In some implementations, the monitoring system also includes a communication interface configured to transmit the thermal images from the infrared camera for external viewing by a user. In some implementations, the thermal images may be provided through various wired and wireless communication techniques. In some implementations, the infrared camera may receive electrical power through a physical coupling to an electrical connector within the cabinet and/or through electromagnetic energy harvesting techniques. Other implementations are also provided.

37 Claims, 5 Drawing Sheets

Related U.S. Application Data continuation-in-part of application No. PCT/US2012/041749, filed on Jun. 8, 2012, and a continuation-in-part of application No. PCT/US2012/041739, filed on Jun. 8, 2012.

(60) Provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/621,385, filed on Apr. 6, 2012.

(51) Int. Cl.
  *H04N 5/247* (2006.01)
  *H04N 5/265* (2006.01)
  *H04N 7/18* (2006.01)

(58) Field of Classification Search
  USPC .................. 348/143, 82; 250/338.1
  See application file for complete search history.

(56) References Cited

U.S. PATENT DOCUMENTS

| | | |
|---|---|---|
| 6,297,794 B1 | 10/2001 | Tsubouchi et al. |
| 6,330,371 B1 | 12/2001 | Chen et al. |
| 6,348,951 B1 | 2/2002 | Kim |
| 6,396,543 B1 | 5/2002 | Shin et al. |
| 6,424,843 B1 | 7/2002 | Reitmaa et al. |
| 6,633,231 B1 | 10/2003 | Okamoto et al. |
| 6,681,120 B1 | 1/2004 | Kim |
| 6,759,949 B2 | 7/2004 | Miyahara |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,420,663 B2 | 9/2008 | Wang et al. |
| 7,453,064 B2 | 11/2008 | Lee |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,616,877 B2 | 11/2009 | Zarnowski et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,872,574 B2 | 1/2011 | Betts et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0058352 A1 | 5/2002 | Jacksen et al. |
| 2002/0079450 A1* | 6/2002 | Wood ................ H01L 27/14625 250/332 |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0109415 A1* | 6/2004 | Zansky ................ G08B 17/12 370/235 |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2005/0280703 A1 | 12/2005 | Narayanaswami et al. |
| 2006/0039686 A1 | 2/2006 | Soh et al. |
| 2006/0049906 A1* | 3/2006 | Liu ................ H01F 17/04 336/200 |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0158152 A1* | 7/2006 | Taniguchi ............ H02J 7/025 320/106 |
| 2006/0170217 A1* | 8/2006 | Kugel ................ H02J 17/00 290/1 R |
| 2006/0210249 A1 | 9/2006 | Seto |
| 2006/0234744 A1 | 10/2006 | Sung et al. |
| 2006/0240867 A1 | 10/2006 | Wang et al. |
| 2006/0266942 A1* | 11/2006 | Ikeda ................ H04N 5/23238 250/334 |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |

(56) References Cited

U.S. PATENT DOCUMENTS

| | | |
|---|---|---|
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027061 A1* | 1/2009 | Curt .................... H02J 13/0055 324/539 |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0050806 A1 | 2/2009 | Schmidt et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0044567 A1* | 2/2010 | Brandt .................. G01J 5/0096 250/334 |
| 2010/0066809 A1 | 3/2010 | Cormack et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0139908 A1* | 6/2010 | Slessman .............. F28F 9/0265 165/279 |
| 2010/0144387 A1 | 6/2010 | Chou |
| 2010/0163730 A1 | 7/2010 | Schmidt et al. |
| 2010/0231396 A1* | 9/2010 | Tump .................... B07B 1/4627 340/652 |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2010/0314947 A1* | 12/2010 | Baarman ................ H02J 5/005 307/104 |
| 2011/0043486 A1 | 2/2011 | Hagiwara et al. |
| 2011/0063446 A1 | 3/2011 | McMordie et al. |
| 2011/0077719 A1* | 3/2011 | Rofougaran .......... G06F 19/323 607/61 |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0254285 A1* | 10/2011 | Hanchett, Jr. ......... E05B 15/022 290/1 R |
| 2012/0007987 A1 | 1/2012 | Gaber |
| 2012/0013292 A1* | 1/2012 | Ali ........................ H02J 7/025 320/108 |
| 2012/0083314 A1 | 4/2012 | Ng et al. |
| 2012/0184252 A1 | 7/2012 | Hirsch |
| 2012/0199689 A1* | 8/2012 | Burkland ............... F42B 15/01 244/3.16 |
| 2012/0262584 A1 | 10/2012 | Strandemar |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0202292 A1* | 8/2013 | Sokolov ................ H04J 14/02 398/34 |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1983485 | 10/2008 |
| EP | 2136554 | 12/2009 |
| EP | 2477391 | 7/2012 |
| JP | 1997275518 | 4/1999 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |

(56) References Cited

FOREIGN PATENT DOCUMENTS

| | | |
|---|---|---|
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |

(56) References Cited

FOREIGN PATENT DOCUMENTS

| | | |
|---|---|---|
| KR | 101111167 | 4/2011 |
| KR | 1111167 | 2/2012 |
| KR | 1020130142810 | 12/2013 |
| TW | 201116030 | 5/2011 |
| WO | WO 99/19825 | 4/1999 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2012/170949 | 12/2012 |

\* cited by examiner

ELECTRICAL CABINET INFRARED MONITOR

CROSS-REFERENCE TO RELATED APPLICATIONS

This application claims the benefit of U.S. Provisional Patent Application No. 61/621,385 filed Apr. 6, 2012 and entitled "ELECTRICAL CABINET INFRARED MONITOR" which is hereby incorporated by reference in its entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

This application relates to sensors, and more particularly to an infrared monitor for electrical cabinets.

BACKGROUND

It is conventional for an electrical distribution system in industrial buildings, offices, and the like to include numerous enclosures (e.g., electrical cabinets) for housing electrical switchgear such as disconnects and circuit breakers. Inspection of the switchgear is essential for safety. For example, overheated switchgear is a prime cause of building fires. Thus, it is conventional to conduct regular inspections and maintenance for the electrical cabinets.

Inspection of electrical switchgear may involve looking for thermal hotspots using an infrared camera. But such inspection is a cumbersome process because the electrical power must typically be shut off for safety reasons before a cabinet can be opened. Accordingly, there is a need in the art for improved electrical cabinet thermal monitoring systems and techniques.

SUMMARY

In accordance with an aspect of the disclosure, a monitoring system for a cabinet includes: an infrared camera configured to capture thermal images of at least a portion of electrical equipment positioned in an interior cavity of the cabinet; and a communication interface configured to transmit the thermal images from the infrared camera for external viewing by a user.

In accordance with another aspect of the disclosure a method of monitoring an interior cavity of a cabinet includes: capturing, by an infrared camera, thermal images of at least a portion of electrical equipment positioned in the interior cavity of the cabinet; and transmitting, by a communication interface, the thermal images from the infrared camera for external viewing by a user.

In accordance with another aspect of the disclosure, a monitoring system for an electrical cabinet is provided that includes: an electromagnetic coupler for receiving electromagnetic energy from a conductor within the electrical cabinet; an energy harvesting circuit for harvesting electrical power from the electromagnetic coupler; a battery for storing the harvested electrical power and for powering the monitoring system; and an infrared camera configured to thermally image an interior of the electrical cabinet.

In accordance with another aspect of the disclosure, a method of monitoring an electrical cabinet is provided that includes: harvesting electromagnetic energy from at least one conductor within the electrical cabinet; storing the harvested electromagnetic energy in an energy storage device; thermally imaging an interior of the electrical cabinet as energized by the energy storage device; and wirelessly transmitting the thermal image to a remote system.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

To address the shortcomings in the thermal monitoring arts, an infrared camera is disclosed that is configured to be permanently integrated with an electrical cabinet. In this fashion, thermal monitoring may be performed continuously without requiring any electrical system shutdowns. To provide even greater convenience, the infrared camera may be powered through power scavenging techniques such that no battery replacement is necessary. In some embodiments, the infrared camera may be powered by physical electrical connections within the electrical cabinet in addition to, or as an alternative to, such power scavenging techniques. In some embodiments, multiple infrared cameras may be provided.

Figure 1:
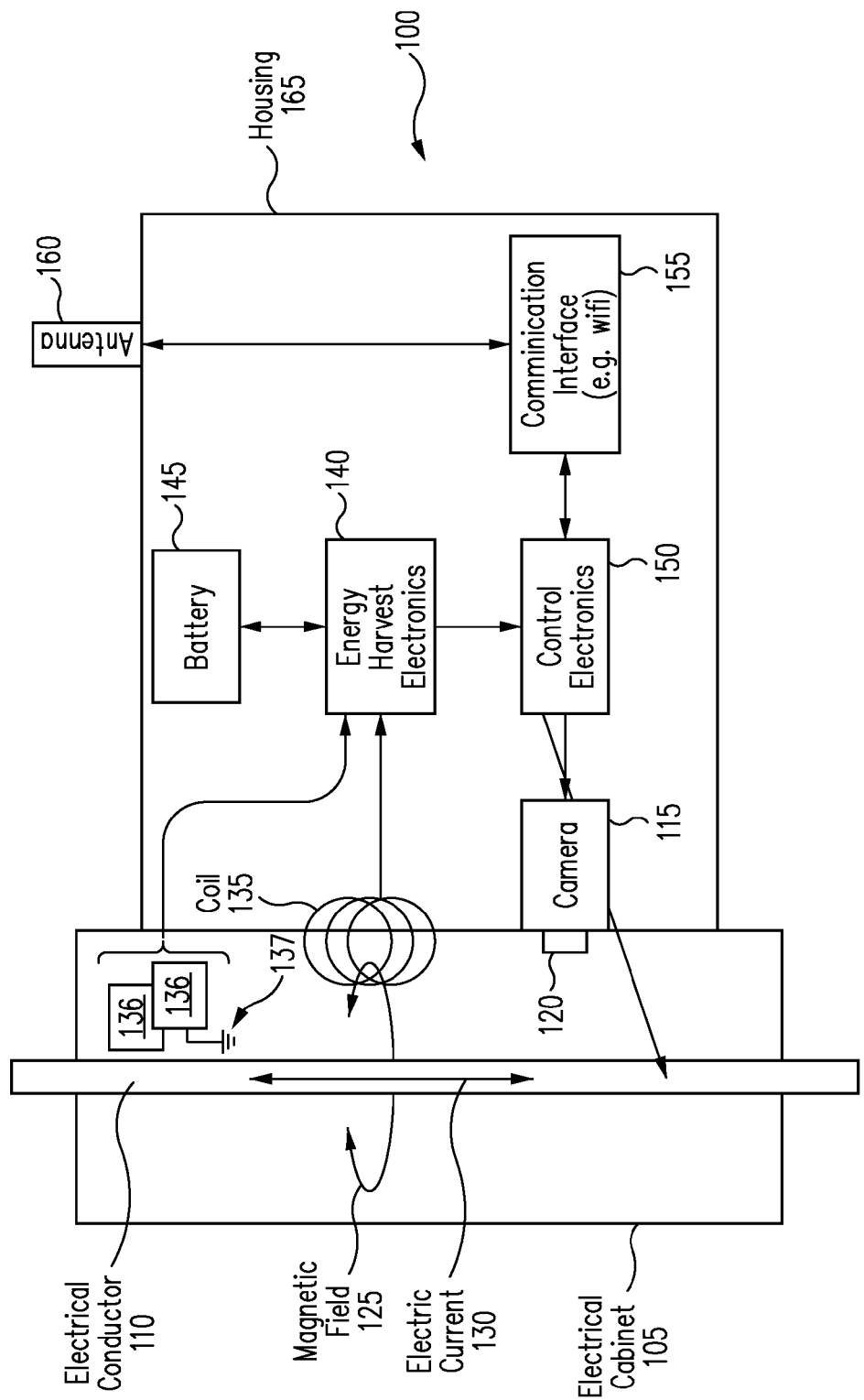
FIG. 1 illustrates an example monitoring system in accordance with an embodiment of the disclosure.

Turning now to the drawings, FIG. 1 illustrates an example electrical monitoring system 100. An electrical cabinet 105 houses various electrical equipment such as, for example, electrical switchgear, conductors, computers, servers, and/or other equipment as appropriate. Such electrical equipment may include an example conductor 110. An infrared camera 115 is positioned to monitor the thermal condition of the electrical equipment within cabinet 105. For example, camera 115 may be mounted to image the electrical equipment using a view port 120 on cabinet 105. In this fashion, the bulk of camera 115 may actually be external to cabinet 105 to enhance safety and code compliance issues in that it is conventional to require a certain amount of clearance about the conductors within an electrical cabinet. However, it will be appreciated that camera 115 may also be positioned substantially within or entirely within cabinet 105. For example, camera 115 may be fastened to an inner surface of cabinet 105 or other appropriate surface within cabinet 105 using magnets, fasteners, adhesives, and/or other appropriate techniques. Although a single camera 115 is illustrated in FIG. 1, additional cameras may be provided as desired to image some or all portions of the electrical equipment within cabinet 105.

The electromagnetic fields generated by current flowing through conductor 110 may be used to conveniently power camera 115 so as to avoid the need for a technician to periodically replace batteries or hardwire AC or DC current to provide power. The electromagnetic fields may be harvested using either an inductive coupling or a capacitive coupling. For example, an inductive coupling harvests a magnetic field 125 that is generated concentrically with regard to a current flow 130 within conductor 110. An inductive coupling thus includes a coil 135 that is arranged orthogonally to magnetic field 125 so that a current is induced in coil 135. Conductor 110 thus acts as a primary coil that transfers power to secondary coil 135 through an air core. In alternative embodiments, a magnetic core transformer may be used to inductively harvest power. Coil 135 may be configured with a resonant tank circuit to increase coupling from conductor 110. To produce a power source using this generated current, a power harvesting circuit 140 couples to coil 135 and charges a battery (or supercapacitor) 145. Battery 145 provides the power for camera 115 as well as a controller 150 and a wireless communication interface 155. Controller 150 controls camera 115 so that resulting thermal images may be wirelessly transmitted to a remote monitoring station (e.g., one or more display systems 420 of FIG. 4) using wireless interface 155 and an antenna(s) 160. A housing 165 protects monitoring system 100.

The transmission of thermal images may be supplemented with the transmission of visible light images as well. Thus, infrared camera 115 may be supplemented with a visible light camera. In addition, parametric data about the thermal image such as the frame rate and exposure time may also be transmitted. Moreover, the wireless transmissions may include information identifying the monitored electrical cabinet such as an identification number and also its location. In addition, system 100 may monitor electrical parameters such as current, power, voltage, or phase angle information and wirelessly transmit the monitored electrical parameters to the remote monitoring station.

Controller 150 may analyze the thermal image from camera 115 with regard to setting a failure condition should the image indicate temperatures exceeding a pre-set tolerance. In that regard, monitoring system 100 may be configured with spot temperature sensors embedded in the electrical cabinet door or housing that are arranged to monitor particular targets within the electrical cabinet 105. System 100 may then package the temperature readings with the wireless transmission of the thermal images. In addition, the electrical cabinet 105 may be further configured with a plexiglass window to allow a technician to visually inspect the cabinet interior.

In alternative embodiments, monitoring system 100 may use a capacitive coupling instead of coil 135. In a capacitive coupling, coil 135 is replaced by conductive plates 136. One of the conductive plates 136 is grounded to a ground 137 for the electrical cabinet 105. The electrical activity within the cabinet 105 induces differential charges between the plates 136 that is harvested to power the monitoring system 100. Regardless of whether an inductive or a capacitive coupling is used, it will be appreciated that the amount of harvestable power through such couplings is typically small. For example, the energy produced by power harvesting circuit 140 is generally in the microwatt to milliwatt range. In contrast, significantly more power is typically required for infrared camera operation and wireless transmission such as through WiFi or Bluetooth. To conserve power, controller 150 may command camera 115 to only capture image frames periodically. For example, frame rates may be in the several per minute range or less.

Figure 2:
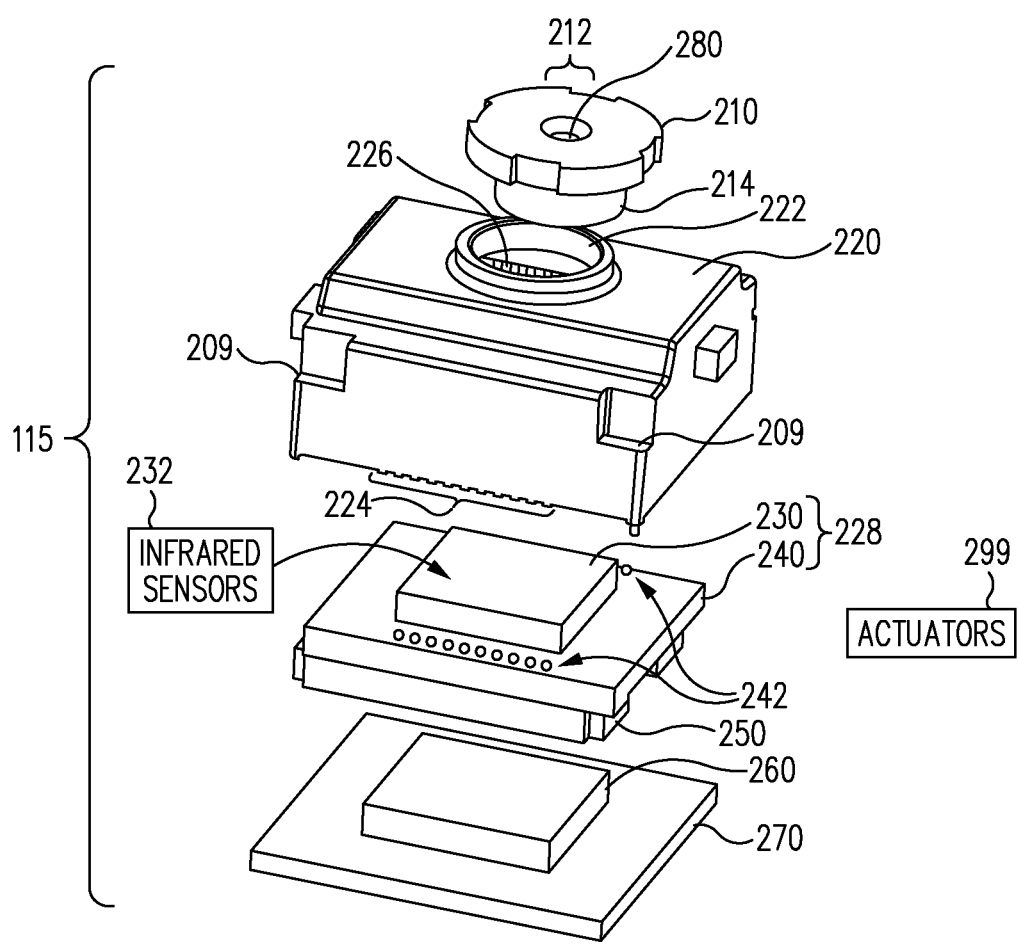
FIG. 2 illustrates an infrared imaging module configured to be implemented in an electrical cabinet monitoring system in accordance with an embodiment of the disclosure.

To operate successfully using such relatively low powers, camera 115 may be constructed as shown in FIG. 2. In this small-form-factor embodiment, camera 115 saves power and cost by not including a shutter. The embodiment of FIG. 2 is better understood with regard to the following noise discussion. Infrared imaging devices (e.g., thermal imagers) often suffer from various types of noise, such as high spatial frequency fixed pattern noise (FPN). Some FPN may be correlated to rows and/or columns of infrared sensors. For example, FPN noise that appears as column noise may be caused by variations in column amplifiers and include a 1/f component. Such column noise can inhibit the ability to distinguish between desired vertical features of a scene and vertical FPN. Other FPN may be spatially uncorrelated, such as noise caused by pixel to pixel signal drift which may also include a 1/f component.

A conventional approach to removing FPN relies on an internal or external shutter that is selectively placed in front of infrared sensors of an infrared imaging device to provide a substantially uniform scene. The infrared sensors may be calibrated based on images captured of the substantially uniform scene while the shutter is positioned in front of the infrared sensors. Such a process is denoted as a non-uniformity correction (NUC) procedure. However, in applications as discussed herein, it is desired to achieve a small-form factor and low-power operation for infrared imaging. The inclusion of a shutter can increase the size, cost, and power demands of such devices. Thus, an infrared camera is disclosed herein that obviates the need for a shutter through an innovative NUC procedure.

FIG. 2 illustrates an exploded view of a low-power, small-form factor infrared camera embodiment 115 configured to implement NUC without a shutter. Infrared camera 115 may include a lens barrel 210, a housing 220 (e.g., including surfaces 209 configured to receive engagement members of a socket for socket-based installations), an infrared sensor assembly 228, a circuit board 270, a base 250, and a processing module 260.

Lens barrel 210 may at least partially enclose an optical element 280 (e.g., a lens) which is partially visible in FIG. 2 through an aperture 212 in lens barrel 210. Lens barrel 210 may include a substantially cylindrical extension 214 which may be used to interface lens barrel 210 with an aperture 222 in housing 220.

Infrared sensor assembly 228 may be implemented, for example, with a cap 230 (e.g., a lid) mounted on a substrate 240. Infrared sensor assembly 228 may include a plurality of infrared sensors 232 (e.g., infrared detectors) implemented in an array or other fashion on substrate 240 and covered by cap 230. For example, in one embodiment, infrared sensor assembly 228 may be implemented as a focal plane array (FPA). Such a focal plane array may be implemented, for example, as a vacuum package assembly (e.g., sealed by cap 230 and substrate 240). In one embodiment, infrared sensor assembly 228 may be implemented as a wafer level package (e.g., infrared sensor assembly 228 may be singulated from a set of vacuum package assemblies provided on a wafer). In one embodiment, infrared sensor assembly 228 may be configured to operate using a power supply of approximately 2.4 volts, 2.5 volts, 2.8 volts, or similar voltages.

Infrared sensors 232 may be configured to detect infrared radiation (e.g., infrared energy) from a target scene within an electrical cabinet including, for example, mid wave infrared wave bands (MWIR), long wave infrared wave bands (LWIR), and/or other thermal imaging bands as may be desired in particular implementations. In one embodiment, infrared sensor assembly 228 may be provided in accordance with wafer level packaging techniques.

Infrared sensors 232 may be implemented, for example, as microbolometers or other types of thermal imaging infrared sensors arranged in any desired array pattern to provide a plurality of pixels. In one embodiment, infrared sensors 232 may be implemented as vanadium oxide (VOx) detectors with a 17 μm pixel pitch. In various embodiments, arrays of approximately 32 by 32 infrared sensors, approximately 64 by 64 infrared sensors, approximately 80 by 64 infrared sensors, or other array sizes may be used to arrange infrared sensors 232.

Substrate 240 may include various circuitry including, for example, a read out integrated circuit (ROIC) with dimensions less than approximately 5.5 mm by 5.5 mm in one embodiment. Substrate 240 may also include bond pads 242 that may be used to contact complementary protruding connections 224 that extend from electrical connections 226 positioned on inside surfaces of camera housing 220 and/or contact appropriate connections of housing 165 (FIG. 1).

In one embodiment, the ROIC may be implemented with low-dropout regulators (LDO) to perform voltage regulation to reduce power supply noise introduced to infrared sensor assembly 228 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 228 may capture images (e.g., image frames) and provide such images from its ROTC at various rates. Processing module 260 may be used to perform appropriate processing of captured infrared images and may be implemented in accordance with any appropriate architecture. In one embodiment, processing module 260 may be implemented as an ASIC. In this regard, such an ASIC may be configured to perform image processing with high performance and/or high efficiency. In another embodiment, processing module 260 may be implemented with a general purpose central processing unit (CPU) which may be configured to execute appropriate software instructions to perform image processing and coordinate with controller 150 (FIG. 1).

Figure 3:
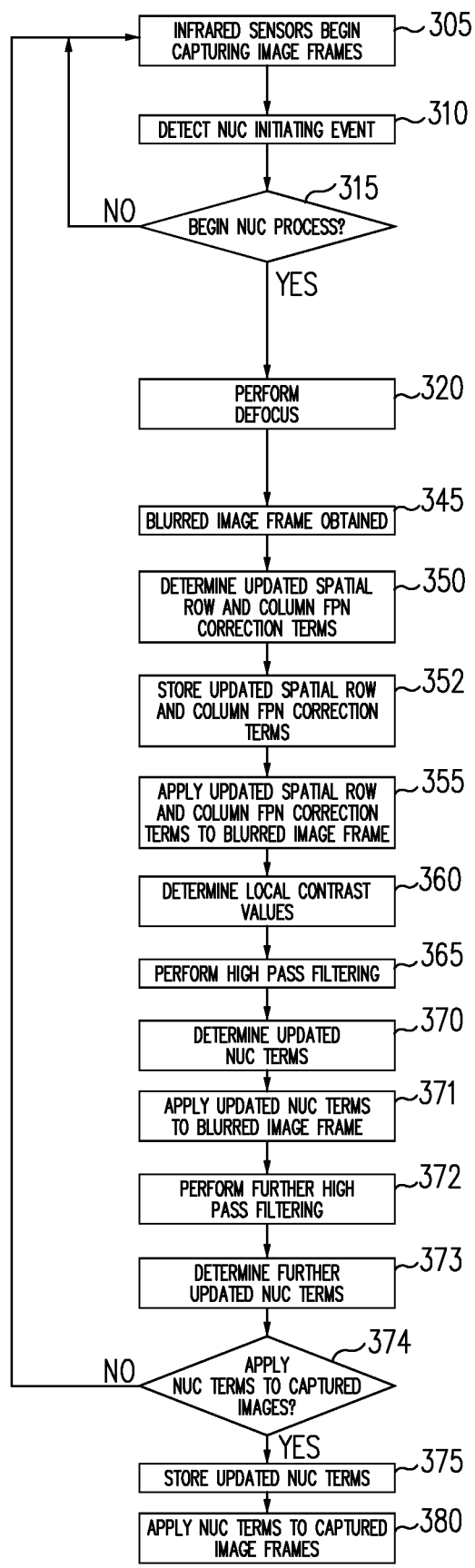
FIG. 3 illustrates a flow diagram of various operations to determine NUC terms in accordance with an embodiment of the disclosure.

The NUC procedure practiced by camera 115 may be better understood with reference to the flowchart of FIG. 3. In a step 305, infrared sensors 232 begin capturing image frames of an electrical cabinet scene. In a step 310, a NUC process initiating event is detected. For example, a NUC process may be initiated by controller 160 (FIG. 1) if a minimum time has elapsed since a previously performed NUC process. In a further example, a NUC process may be initiated by controller 160 if infrared camera 110 has experienced a minimum temperature change since a previously performed NUC process.

In a step 315, after a NUC process initiating event is detected, it is determined whether the NUC process should actually be performed. In this regard, the NUC process may be selectively initiated based on whether one or more additional conditions are met. For example, in one embodiment, the NUC process may not be performed unless infrared camera 115 has experienced a minimum temperature change since a previously performed NUC process. Other criteria or conditions may be used in other embodiments. If appropriate criteria or conditions have been met, then the flow diagram continues to a step 320. Otherwise, the flow diagram returns to step 305.

In step 320, a defocus operation may be performed to intentionally defocus the image frames captured by infrared sensors 232. For example, in one embodiment, one or more actuators 299 (FIG. 2) may be used to adjust, move, or otherwise translate optical element 280, infrared sensor assembly 228, and/or other components of infrared camera 110 to cause infrared sensors 232 to capture a blurred (e.g., unfocused) image frame of the electrical cabinet scene. Other non-actuator based techniques are also contemplated for intentionally defocusing infrared image frames such as, for example, manual (e.g., user-initiated) defocusing. In a step 345, a blurred image frame of the electrical cabinet scene will be provided with FPN being more clearly defined in the blurred image than would be the case for an focused image.

In the above discussion, the defocus-based approach has been described with regard to a single captured image frame. In another embodiment, the defocus-based approach may include accumulating multiple image frames while infrared camera 115 has been defocused and averaging the defocused image frames to remove the effects of temporal noise and provide a blurred image frame in step 345. The defocusing process may be considered to act as a lowpass filter on the electrical cabinet image. Other techniques are also contemplated to obtain blurred images such as, for example, any of the techniques set forth in International Patent Application No. PCT/US2012/041749 and U.S. Provisional Patent Application No. 61/545,056 identified above. In a step 350, the blurred image frame is processed to determine updated row and column FPN terms (e.g., if row and column FPN terms have not been previously determined then the updated row and column FPN terms may be new row and column FPN terms in the first iteration of step 350). As used in this disclosure, the terms row and column may be used interchangeably depending on the orientation of infrared sensors 232 and/or other components of infrared camera 115.

In one embodiment, step 350 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

In one embodiment, row and column FPN terms may be determined by considering differences between neighboring pixels of the blurred image frame. For example, a pixel in the blurred image frame may be compared to its 8 nearest horizontal neighbors. Differences between the neighbor pixels can be averaged to obtain an estimate of the offset error of the resulting group of pixels. An offset error may be calculated for each pixel in a row or column and the average result may be used to correct the entire row or column.

To prevent real scene data from being interpreted as noise, upper and lower threshold values may be used. Pixel values falling outside these threshold values are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 3, the updated row and column FPN terms determined in step 350 are stored in a step 352 and applied in a step 355 to the blurred image frame obtained in step 345. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In a step 360, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in step 360.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of step 360 may be performed on the blurred image frame after row and column FPN terms have been applied to the blurred image frame. In another embodiment, step 360 may be performed prior to step 350 to determine contrast before row and column FPN terms are determined (e.g., to prevent scene based contrast from contributing to the determination of such terms).

Following step 360, it is expected that any high spatial frequency content remaining in the blurred image frame may be generally attributed to spatially uncorrelated FPN. In this regard, following step 360, much of the other noise or actual desired scene based information has been removed or excluded from the blurred image frame due to: intentional blurring of the image frame (the defocusing in step 320), application of row and column FPN terms (step 355), and contrast determination (step 360).

Thus, it can be expected that following step 360, any remaining high spatial frequency content (e.g., exhibited as areas of contrast or differences in the blurred image frame) may be attributed to spatially uncorrelated FPN. Accordingly, in a step 365, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In a step 370, a flat field correction process is performed on the high pass filtered blurred image frame to determine updated NUC terms (e.g., if a NUC process has not previously been performed then the updated NUC terms may be new NUC terms in the first iteration of step 370). To perform flat field correction, a NUC term may be determined for each pixel of the blurred image frame using the values of its neighboring pixels. For each pixel, several gradients may be determined based on the absolute difference between the values of various adjacent pixels. For example, absolute value differences may be determined between pixels to establish a left to right diagonal gradient, a top to bottom vertical gradient, a right to left diagonal gradient, and a left to right horizontal gradient.

These absolute differences may be summed to provide a summed gradient for the pixel being examined. A weight value may be determined for the examined pixel that is inversely proportional to the summed gradient. This process may be performed for all pixels of the blurred image frame until a weight value is provided for each pixel. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor X between 0 and 1 may be chosen such that the new NUC term (NUCNEW) stored is a weighted average of the old NUC term (NUCOLD) and the estimated updated NUC term (NUCUPDATE). In one embodiment, this can be expressed as NUCNEW=$\lambda$·NUCOLD+(1−$\lambda$)·(NUCOLD+NUCUPDATE).

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 3, step 370 may include additional processing of the NUC terms. For example, in one embodiment, to preserve the scene signal mean, the sum of all NUC terms may be normalized to zero by subtracting the NUC term mean from each NUC term. Also in step 370, to avoid row and column noise from affecting the NUC terms, the mean value of each row and column may be subtracted from the NUC terms for each row and column. As a result, row and column FPN filters using the row and column FPN terms determined in step 350 may be better able to filter out row and column noise in further iterations after the NUC terms are applied to captured images (e.g., in a step 380 further discussed herein). In this regard, the row and column FPN filters may in general use more data to calculate the per row and per column offset coefficients (e.g., row and column FPN tennis) and may thus provide a more robust alternative for reducing spatially correlated FPN than the NUC terms which are based on high pass filtering to capture spatially uncorrelated noise.

In steps 371-373, additional high pass filtering and further determinations of updated NUC terms may be optionally performed to remove spatially correlated FPN with lower spatial frequency than previously removed by row and column FPN terms. In this regard, some variability in infrared sensors 232 or other components of infrared camera 110 may result in spatially correlated FPN noise that cannot be easily modeled as row or column noise. Such spatially correlated FPN may include, for example, window defects on a sensor package or a cluster of infrared sensors 232 that respond differently to irradiance than neighboring infrared sensors 232. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of step 365 is performed with a small kernel (e.g., considering only immediately adjacent pixels that fall within a neighborhood of pixels affected by spatially correlated FPN), then broadly distributed spatially correlated FPN may not be detected.

Referring again to FIG. 3, in steps 371-373, additional high pass filtering and further determinations of updated NUC terms may be optionally performed to remove spatially correlated FPN. In step 371, the updated NUC terms determined in step 370 are applied to the blurred image frame. Thus, at this time, the blurred image frame will have been initially corrected for spatially correlated FPN (e.g., by application of the updated row and column FPN terms in step 355), and also initially corrected for spatially uncorrelated FPN (e.g., by application of the updated NUC terms applied in step 371).

In step 372, a further high pass filter is applied with a larger kernel than was used in step 365, and further updated NUC terms may be determined in step 373. For example, to detect the spatially correlated FPN present in the defocused image frame pixels, the high pass filter applied in step 372 may include data from a sufficiently large enough neighborhood of pixels such that differences can be determined between unaffected pixels and affected pixels. For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in step 373.

In various embodiments, steps 371-373 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of steps 371-373.

After steps 371-373 are finished, a decision is made regarding whether to apply the updated NUC terms to captured image frames (step 374). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to step 305. Otherwise, the newly determined NUC terms are stored (step 375) to replace previous NUC terms (e.g., determined by a previously performed iteration of FIG. 3) and applied (step 380) to captured image frames. Additional details regarding this advantageous NUC algorithm are discussed in U.S. Provisional Application No. 61/545,056, filed Oct. 7, 2011, the contents of which are incorporated by reference in their entirety.

Figure 4:
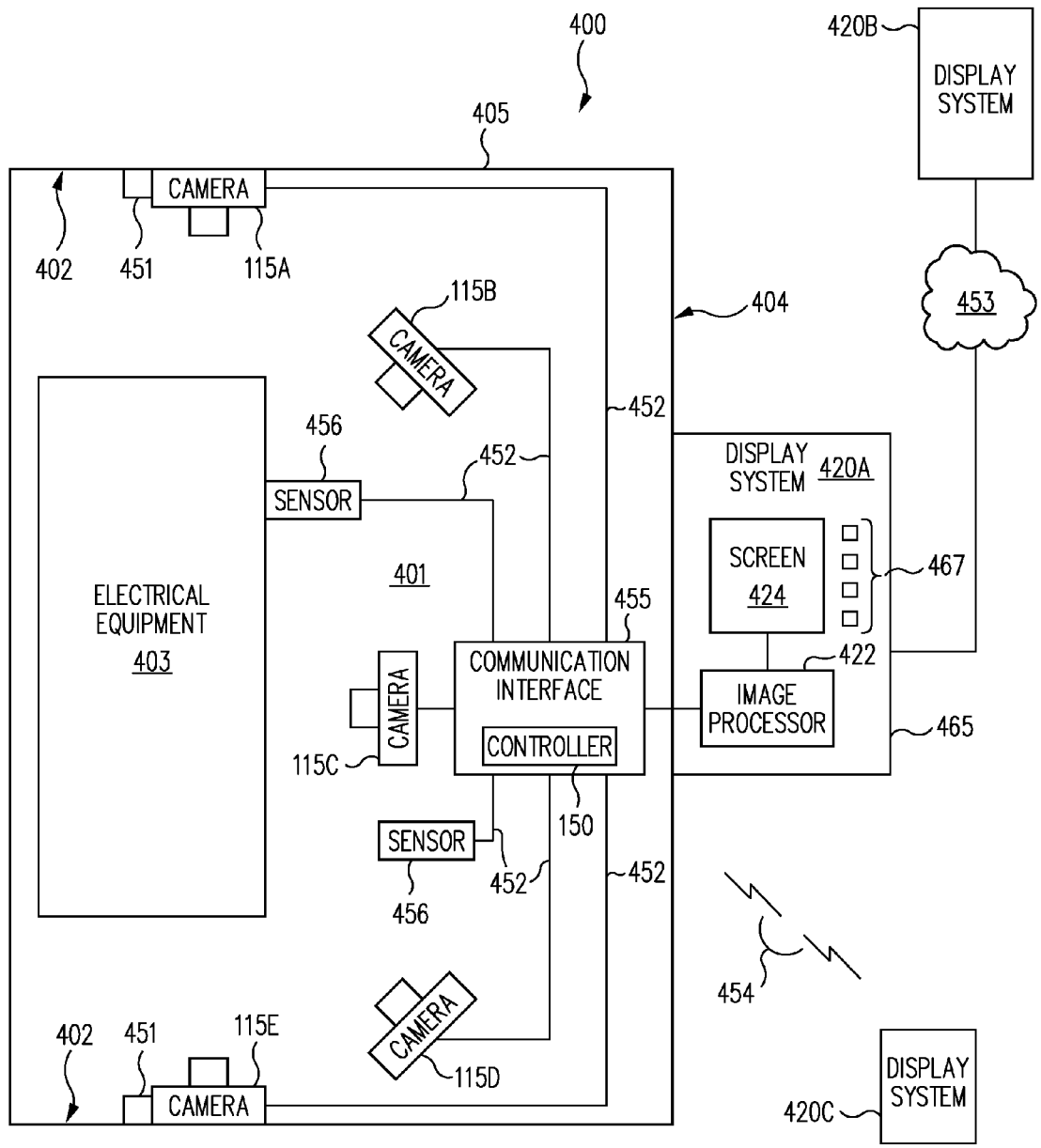
FIG. 4 illustrates another example monitoring system in accordance with an embodiment of the disclosure.

FIG. 4 illustrates another example monitoring system 400 in accordance with an embodiment of the disclosure. Monitoring system 400 may be used, for example, to capture, communicate, process, and/or display thermal images of electrical equipment 403 positioned in an interior cavity 401 of an electrical cabinet 405. Monitoring system 400 may include, for example, one or more infrared cameras 115 (e.g., denoted 115A-E in FIG. 4), one or more communication interfaces 455, and one or more display systems 420 (e.g., denoted 420A-C in FIG. 4).

Infrared cameras 115 may be positioned at various locations within interior cavity 401 of electrical cabinet 405 to provide views of electrical equipment 403. Although particular infrared cameras 115 are illustrated in a substantially hemispherical arrangement around electrical equipment 403, any desired camera arrangement may be used. For example, in some embodiments, various infrared cameras 115 may be arranged to completely surround electrical equipment 403, to view selected portions of electrical equipment 403, or other arrangements.

Infrared cameras 115A and 115E are illustrated as being mounted to interior surfaces 402 of electrical cabinet 405. For purposes of clarity, infrared cameras 115B-D are illustrated without corresponding support structures. However, any desired support structures may be used for any of infrared cameras 115.

Although electrical equipment 403 is illustrated as being positioned proximate to one wall (e.g., a rear wall) of electrical cabinet 405, electrical equipment 403 may be disposed at any location or multiple locations within electrical cabinet 405. Infrared cameras 115 may be positioned as desired to view appropriate portions of electrical equipment 403, depending on the particular position of electrical equipment 403 within electrical cabinet 405.

In some embodiments, electrical cabinet 405 may include electrical connectors 451 which may be used to provide power to infrared cameras 115. In this regard, infrared cameras 115A and 115E are illustrated as receiving electrical power through a physical coupling to electrical connectors 451. For purposes of clarity, infrared cameras 115B-D are illustrated without their corresponding electrical connectors.

Any desired combination of electrical connectors 451 of FIG. 4 and/or electromagnetic field harvesting/storing/powering components of FIG. 1 may be used to power infrared cameras 115. For example, any of infrared cameras 115A-E may be powered by physical electrical connectors 451, harvested electromagnetic energy, and/or both.

Infrared cameras 115 may provide captured thermal images and/or other data to communication interface 455 over various communication busses 452. In FIG. 4, communication interface 455 is illustrated as a wired communication interface. However, communication interface 455 may be implemented as a wireless communication interface (e.g., in the manner of wireless communication interface 155) or a hybrid wired/wireless interface supporting any desired combination of wired and/or wireless communication with infrared cameras 115 and/or other components. In some embodiments, communication interface 455 may be implemented to include controller 150 previously described herein. In some embodiments, controller 150 may be implemented separately from communication interface 455.

Communication interface 455 and/or other components may be implemented to communicate in accordance with any appropriate protocols such as, for example, Modbus, Modbus TCP, Ethernet, WiFi, Bluetooth, and/or others.

Communication interface 455 may also receive data from one or more sensors 456 (e.g., temperature sensors, current sensors, power sensors, voltage sensors, phase angle sensors, and/or others) which may be provided as part of monitoring system 400 at any desired location within and/or outside of electrical cabinet 405. For example, as shown in FIG. 4, various sensors 456 may be positioned on electrical equipment 403 or away from electrical equipment 403. Sensor data may be received by communication interface 455 over various communication busses 452 and passed by communication interface 455 to other components as desired.

One or more display systems 420 (e.g., denoted 420A-C) may be provided to permit monitoring of thermal images and data provided by communication interface 455. For example, display system 420A includes a housing 465, an image processor 422, a user-viewable screen 424, and user controls 467.

Image processor 422 may process thermal images received from communication interface 455 to prepare user-viewable images to be displayed on screen 424. For example, in some embodiments, image processor 422 may be configured to provide thermal images to screen 424 for simultaneous viewing by the user.

In some embodiments, image processor 422 may be configured to combine thermal images into composite thermal images by performing various image processing. For example, multiple thermal images may be assembled (e.g., "stitched together") to provide composite thermal images showing a panorama view or other view of electrical equipment 403. Image processor 422 may provide such composite thermal images to screen 424 for viewing by the user. Such composite thermal images may be provided in addition to and/or instead of the original thermal images to permit the user to conveniently switch between different views if desired (e.g., by controlling the operation of image processor 422 by user controls 467).

In some embodiments, image processor 422 may embed additional information (e.g., sensor provided by sensors 456) in thermal images and/or composite thermal images provided to screen 424. In some embodiments, image processor 422 may perform any of the various image processing described or incorporated by reference herein including, for example, NUC. Other image processing may also be performed such as, for example, measurement, colorization, noise reduction, or other processes. In some embodiments, image processor 422 may perform various processing operations in combination with or separate from controller 150, communication interface 455, processing module 260, and/or other components.

Although various components of monitoring system 400 are illustrated as being positioned inside electrical cabinet 405 (e.g., in interior cavity 401) and others are positioned outside, any of the various components may be positioned inside or outside as may be desired for particular implementations. For example, in some embodiments, image processor 422 and/or other components may be positioned outside electrical cabinet 405 and within housing 465 to prevent any heat given off by such components from affecting the temperature or thermal images captured from within electrical cabinet 405. In other embodiments, some or all of such components may be positioned within electrical cabinet 405, or within a wall thereof. In other embodiments, controller 150, communication interface 455, and/or other components may be mounted outside of electrical cabinet 405 (e.g., within housing 465 or elsewhere).

As shown in FIG. 4, display system 420A may be mounted, for example, on an outside surface 404 (e.g., a door or panel) of electrical cabinet 405. In this regard, screen 424 may be positioned such that a user may conveniently view thermal images or composite thermal images while in proximity to electrical cabinet 405.

Other display systems are also contemplated. For example, a display system 420B may be positioned remotely from electrical cabinet 405. In this regard, display system 420B may communicate with other portions of monitoring system 400 over a network 453 (e.g., one or more wired and/or wireless networks).

As another example, a display system 420C may be implemented as a mobile device. In this regard, display system 420C may be implemented with dedicated hardware, software running on generic or dedicated hardware (e.g., an application running on a smart phone or tablet), and/or other implementations. As shown in FIG. 4, display system 420C may communicate with other portions of monitoring system 400 through wireless signals 454 (e.g., received by communication interface 455 when implemented to provide support for wireless communication). In some embodiments, infrared cameras 115 may be implemented with built-in support for wireless communication to permit wireless communication with any of display systems 420A-C.

Any of display systems 420A-C may be implemented with image processors 422, screens 424, user controls 467, housings 465, communication components, processors, memories, and/or other appropriate components. It is contemplated that components may be shared by various display systems. For example, in some embodiments, a single image processor 422 may be provided for monitoring system 400. In this regard, thermal images and/or composite thermal images may be provided from image processor 422 to any of display systems 420A-C through appropriate wired or wireless communication techniques.

Figure 5:
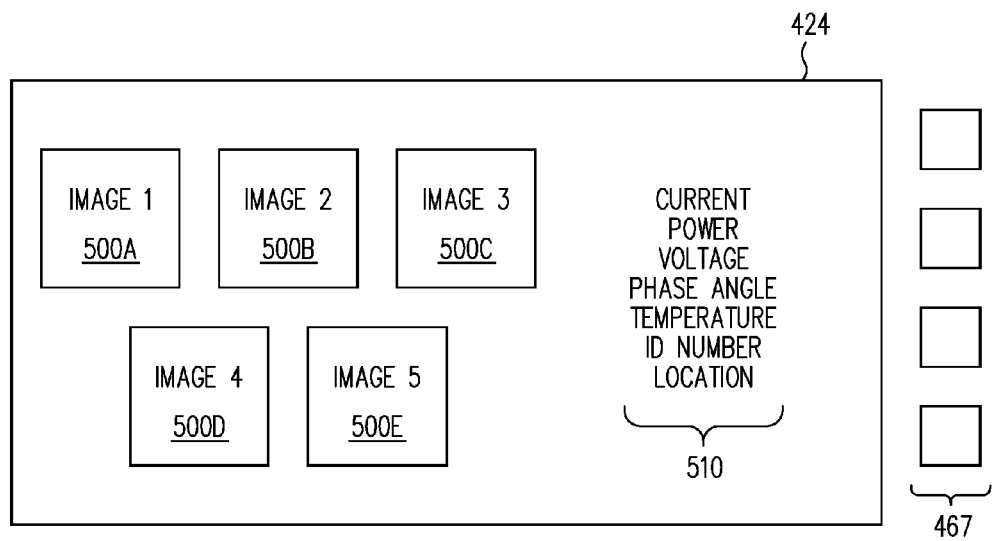
FIGS. 5-6 illustrate example user interfaces of display systems in accordance with embodiments of the disclosure.
Figure 6:
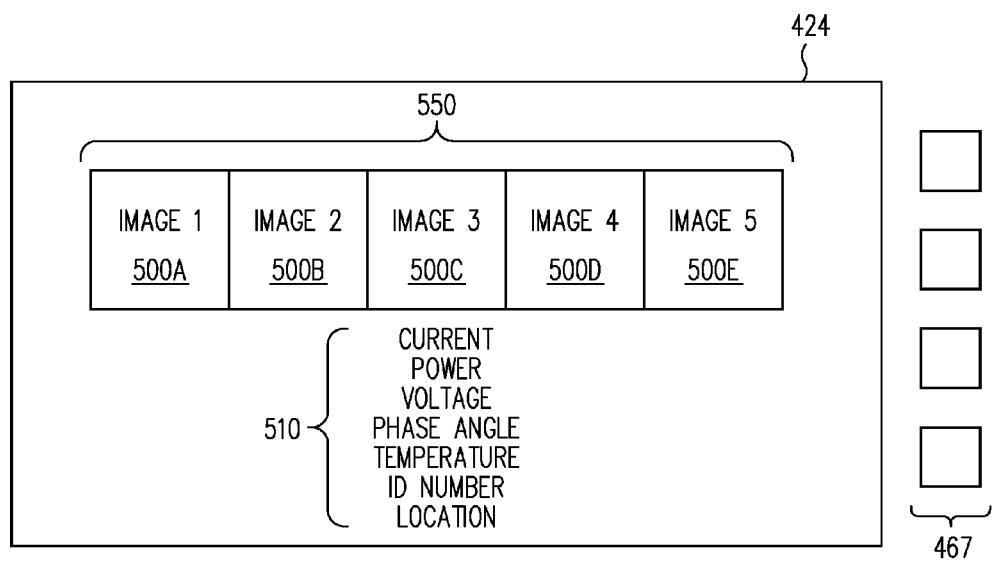

FIGS. 5-6 illustrate example user interfaces of display systems 420 in accordance with embodiments of the disclosure. Referring to FIG. 5, screen 424 simultaneously displays images 500A-E captured by corresponding infrared cameras 115A-E. Screen 424 also displays information 510 such as various parameters associated with electrical equipment 403 and/or electrical cabinet 405. In some embodiments, such information may be passed by infrared cameras 115, sensors 456, controller 150, and/or other components through communication interface 455 to image processor 422 and/or display 424. For example, in some embodiments, information 510 may be based on readings provided by sensors 456 and/or processing performed on thermal images captured by infrared cameras 115.

As also shown in FIG. 5A, various user controls 467 may be provided to permit a user to select various thermal images and/or information to be displayed on screen 424. For example, in some embodiments, user operation of controls 467 may send appropriate control signals to screen 424, image processor 422, communication interface 455, controller 150, cameras 115, sensors 456, and/or other components. Although controls 430 are illustrated as buttons, any desired type of user control may be provided. For example, in some embodiments, screen 424 may be a user control implemented as a touchscreen.

Referring to FIG. 6, screen 424 simultaneously displays a composite thermal image 550 prepared by appropriate processing of images 500A-E. In this regard, composite thermal image 550 may provide a panoramic view of electrical equipment 403 collectively provided by infrared cameras 115A-E.

In some embodiments, monitoring system 400 may be configured to provide alerts and/or take corrective action (e.g., disabling and/or otherwise adjusting the operation of electrical equipment 403) in response to user controls 467 (e.g., a user-initiated operation performed in response to a user's review of images or information provided on screen 424). In some embodiments, monitoring system 400 may be configured to provide alerts and/or take corrective action automatically in response to the processing of images and/or sensor data.

Although various monitoring systems have been described with regard to electrical cabinets, the techniques described herein may be used in any environment where monitoring of thermal images may be useful, such as the monitoring of electrical equipment in data centers or other appropriate locations.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A monitoring system for a cabinet, the system comprising:
   an infrared camera configured to capture thermal images of at least a portion of monitored electrical equipment positioned in an interior cavity of the cabinet;
   a communication interface configured to transmit the thermal images from the infrared camera for external viewing by a user;
   an electromagnetic coupler configured to be disposed adjacent to at least one conductor of the monitored electrical equipment within the cabinet and receive a magnetic field generated concentrically to a current passed by the at least one conductor of the monitored electrical equipment within the cabinet;
   an energy harvesting circuit coupled to the electromagnetic coupler and configured to provide electrical power in response to a change induced in the electromagnetic coupler by the magnetic field; and
   a battery configured to store the electrical power and to power the infrared camera.

2. The monitoring system of claim 1, wherein the thermal images are displayed on a user-viewable screen.

3. The monitoring system of claim 2, wherein the screen is mounted on an exterior surface of the cabinet.

4. The monitoring system of claim 2, wherein the screen is remote from the cabinet.

5. The monitoring system of claim 2, wherein the screen is configured to display one or more electrical parameters associated with the electrical equipment.

6. The monitoring system of claim 1, wherein the infrared camera is one of a plurality of infrared cameras of the monitoring system configured to capture thermal images of corresponding portions of the electrical equipment, wherein the communication interface is configured to transmit the thermal images from the infrared cameras for external viewing by the user.

7. The monitoring system of claim 6, further comprising an image processor configured to receive the thermal images from the communication interface and provide the thermal images to a user-viewable screen.

8. The monitoring system of claim 7, further comprising the screen.

9. The monitoring system of claim 7, wherein the image processor is configured to provide the thermal images to the screen for simultaneous viewing of the thermal images by the user.

10. The monitoring system of claim 7, wherein the image processor is configured to combine the thermal images into composite thermal images and provide the composite thermal images to the screen for viewing of the composite thermal images by the user.

11. The monitoring system of claim 1, wherein the infrared camera is further configured to receive electrical power through a physical coupling to an electrical connector within the cabinet.

12. The monitoring system of claim 1, wherein the electromagnetic coupler is a resonant tank circuit.

13. The monitoring system of claim 1, wherein:
   the current passed by the at least one conductor is a first current;
   the electromagnetic coupler comprises an inductive coil arranged orthogonal to the magnetic field;
   the change comprises a second current induced in the inductive coil by the magnetic field; and
   the energy harvesting circuit is configured to provide electrical power from the second current.

14. The monitoring system of claim 1, wherein:
   the electromagnetic coupler comprises a plurality of conductive plates configured to interact with the magnetic field;
   the change comprises differential charges induced between the conductive plates; and
   the energy harvesting circuit is configured to provide electrical power from the differential charges.

15. The monitoring system of claim 1, wherein the communication interface is a wireless interface.

16. The monitoring system of claim 15, wherein the wireless communication interface is a WiFi interface or a Bluetooth interface.

17. The monitoring system of claim 1, further comprising a controller configured to control a frame rate of the infrared camera and a frame transmission rate of the communication interface.

18. The monitoring system of claim 1, wherein the infrared camera is configured to implement non-uniformity correction (NUC) without a shutter.

19. The monitoring system of claim 18, further comprising an actuator configured to be actuated to blur at least one of the thermal images captured by the infrared camera to implement the NUC.

20. A method of monitoring an interior cavity of a cabinet, the method comprising:
   capturing, by an infrared camera, thermal images of at least a portion of monitored electrical equipment positioned in the interior cavity of the cabinet;
   transmitting, by a communication interface, the thermal images from the infrared camera for external viewing by a user;
   receiving, by an electromagnetic coupler disposed adjacent to at least one conductor of the monitored electrical equipment within the cabinet, a magnetic field generated concentrically to by a current passed by the at least one conductor of the monitored electrical equipment within the cabinet;
   providing, by an energy harvesting circuit coupled to the electromagnetic coupler, electrical power in response to a change induced in the electromagnetic coupler by the magnetic field;
   storing, by a battery, the electrical power; and
   powering, by the battery, the infrared camera.

21. The method of claim 20, further comprising displaying the thermal images on a user-viewable screen.

22. The method of claim 21, wherein the screen is mounted on an exterior surface of the cabinet.

23. The method of claim 21, wherein the screen is remote from the cabinet.

24. The method of claim 21, further comprising displaying one or more electrical parameters associated with the electrical equipment.

25. The method of claim 20, wherein the infrared camera is one of a plurality of infrared cameras, the method further comprising:

capturing, by the infrared cameras, thermal images of corresponding portions of the electrical equipment; and transmitting, by the communication interface, the thermal images from the infrared cameras for external viewing by the user.

26. The method of claim 25, further comprising:

receiving the thermal images from the communication interface at an image processor; and providing the thermal images from the image processor to a user-viewable screen.

27. The method of claim 26, wherein the providing comprises providing, by the image processor, the thermal images to the screen for simultaneous viewing of the thermal images by the user.

28. The method of claim 26, further comprising:

combining, by the image processor, the thermal images into composite thermal images; and providing, by the image processor, the composite thermal images to the screen for viewing of the composite thermal images by the user.

29. The method of claim 20, further comprising receiving electrical power at the infrared camera through a physical coupling to an electrical connector within the cabinet.

30. The method of claim 20, wherein the electromagnetic coupler is a resonant tank circuit.

31. The method of claim 20, wherein:

the current passed by the at least one conductor is a first current;

the electromagnetic coupler comprises an inductive coil arranged orthogonal to the magnetic field;

the change comprises a second current induced in the inductive coil by the magnetic field; and the energy harvesting circuit is configured to provide electrical power from the second current.

32. The method of claim 20, wherein:

the electromagnetic coupler comprises a plurality of conductive plates configured to interact with the magnetic field;

the change comprises differential charges induced between the conductive plates; and the energy harvesting circuit is configured to provide electrical power from the differential charges.

33. The method of claim 20, wherein the communication interface is a wireless interface.

34. The method of claim 33, wherein the wireless communication interface is a WiFi interface or a Bluetooth interface.

35. The method of claim 20, further comprising controlling a frame rate of the infrared camera and a frame transmission rate of the communication interface.

36. The method of claim 20, further comprising performing a non-uniformity correction (NUC) using the infrared camera without a shutter.

37. The method of claim 36, further comprising blurring at least one of the thermal images captured by the infrared camera to implement the NUC.

* * * * *